United States Patent [19]

Conti

[11] Patent Number: 5,708,244
[45] Date of Patent: Jan. 13, 1998

[54] HANDGRIP SWITCH ASSEMBLY

[76] Inventor: William S. Conti, 17 Joy St., Barrington, R.I. 02806

[21] Appl. No.: 545,240

[22] Filed: Oct. 19, 1995

[51] Int. Cl.$^6$ .................................................. H01H 9/06
[52] U.S. Cl. ..................... 200/64.85; 74/551.9; 200/293.1
[58] Field of Search ..................... 200/61.54–61.57, 200/61.85, 86 R, 293.1, 61.43, 295; 74/551.9

[56] References Cited

U.S. PATENT DOCUMENTS

| | | | |
|---|---|---|---|
| D. 274,122 | 6/1984 | Stahel et al. | D8/303 |
| D. 335,437 | 5/1993 | Wilson | D8/303 |
| D. 345,685 | 4/1994 | Lin | D8/303 |
| 2,943,164 | 6/1960 | Kniffin, Jr. | 200/61.57 |
| 2,946,869 | 7/1960 | Parks et al. | 200/61.57 |
| 3,205,729 | 9/1965 | Golden | 74/551.9 |
| 3,321,592 | 5/1967 | Miller | 200/61.43 |
| 3,476,897 | 11/1969 | De Vincent | 200/61.57 |
| 3,485,974 | 12/1969 | Wolf | 200/61.57 |
| 3,524,032 | 8/1970 | Conterno | 200/61.54 |
| 3,544,746 | 12/1970 | Wolf et al. | 200/61.57 |
| 3,823,616 | 7/1974 | Houseman et al. | 74/551.9 X |
| 3,848,480 | 11/1974 | Oseroff | 74/551.9 |
| 3,878,348 | 4/1975 | German | 200/295 X |
| 4,098,506 | 7/1978 | Gaiser | 74/558 |
| 4,416,166 | 11/1983 | Jannard | 74/551.9 |
| 4,455,463 | 6/1984 | Rohl | 200/61.85 |
| 4,535,649 | 8/1985 | Stahel | 74/551.9 |
| 4,540,871 | 9/1985 | Corrigall et al. | 200/61.85 X |
| 4,611,671 | 9/1986 | Hansson | 74/551.9 X |
| 4,742,192 | 5/1988 | Levine et al. | 200/61.57 |
| 4,847,454 | 7/1989 | Hiruma | 200/61.85 X |
| 4,868,544 | 9/1989 | Havens | 200/61.85 X |
| 5,125,286 | 6/1992 | Wilson | 74/551.9 |
| 5,439,216 | 8/1995 | Ganger, Sr. | 273/75 |

*Primary Examiner*—J. R. Scott
*Attorney, Agent, or Firm*—Barlow & Barlow, Ltd.

[57] ABSTRACT

A safety improvement for a Motorcycles warning actuation switch. The hand grip commonly made of rubber or leather material incorporates a ribbon switch that encompasses a 360 degree area. The ribbon switch is preferably placed in the inside end of the hand grip. Normal hand placement on the hand grip will not actuate the warning device unless deliberate. The ribbon switch is a momentary switching device. As the hand grip is depressed or squeezed at any point around its 360 degree arc, the ribbon switch contacts are closed, therefore actuating the warning device, ordinarily a horn.

2 Claims, 5 Drawing Sheets

HANDGRIP SWITCH ASSEMBLY

BACKGROUND OF THE INVENTION

This invention relates to Motorcycles and Cycles in general, specifically to an improved warning actuation device.

Previous to this invention, a warning device on a motorcycle was actuated by means of a switch located inches away from the hand grip. In order for the cyclist to actuate such warning device the procedure was to relieve their thumb from the hand grip. Consequently the rider no longer had a complete firm grip as he had to reach with his thumb inches away to depress the switch. Generally the warning device is a horn, and is actuated to alert others of a potential collision or other impending danger, therefore maintaining control and balance is imperative to the cyclist. Releasing a complete firm grip can interfere with proper and safe control. Another matter that is taken into consideration is that the cyclist may not have the time to actuate the warning device in this manner. And since the switch is inches away, the cyclist may feel uncomfortable during the actuation state. Therefore, the Cyclist may be unable to warn the adversary safely, and possibly endangering themselves and others.

The prior art with which I am familiar relates to automotive horn actuation devices and are exemplified by U.S. Pat. Nos. 4,742,192, 3,476,897 and 2,946,870. Prior art concerning handlebar hand grips of which I am familiar, mainly consist of design, comfort, and non-slip materials such as, U.S. Pat. No. 5,125,286 issued to, Wilson, June, 1992. Up until now, no one has contributed a solution to the hazard of actuating the warning device on motorcycles (Cycles).

SUMMARY OF THE INVENTION

Accordingly, the object and advantage of the instant invention is to provide the cyclist with a safe manner of which to actuate a warning device. The hand grip and switch provides the operator with a firm complete grip while the warning device is actuated. The cyclist need only squeeze or press the hand grip, without loss of time, control, or discomfort, thereby eliminating the potential hazard of a partial grip. A firm complete grip is of much greater value.

A preferred embodiment of the invention utilizes a ribbon switch circumferentially embracing the hand grip at one end thereof. The ribbon switch may be received in an interior recess at one end of the hand grip.

Further objects and advantages of the hand grip and switch will become apparent from a consideration of the drawings and ensuing description.

DETAILED DESCRIPTION OF THE INVENTION

Figure 1:
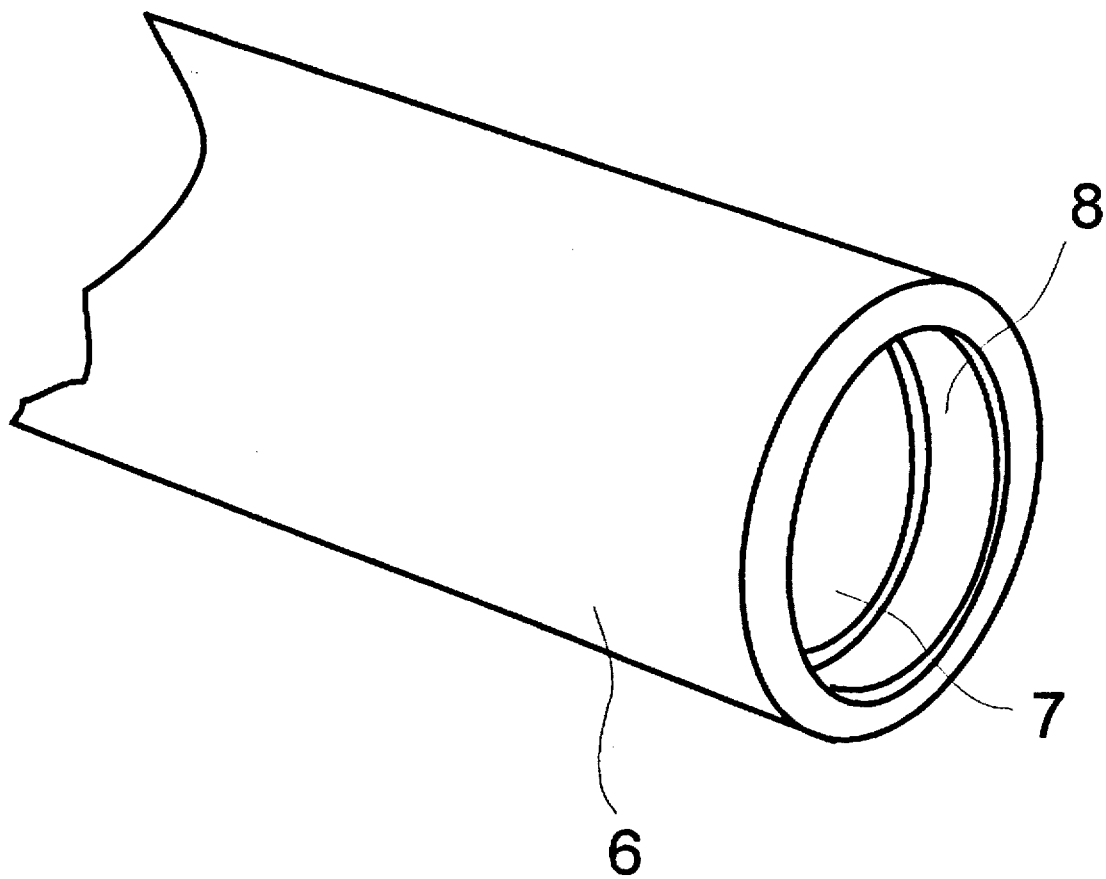
FIG. 1 is a partial perspective view of the hand grip in accordance with the invention
Figure 2:
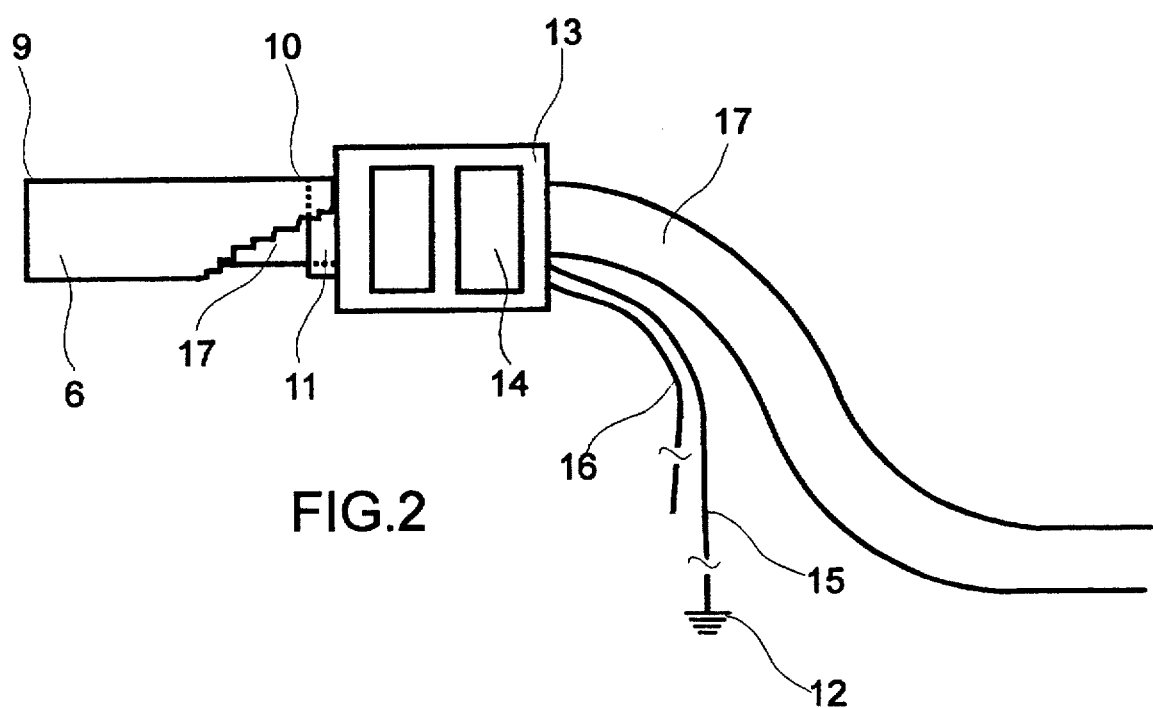
FIG. 2 is an elevation view, partially broken away, illustrating the hand grip installed on a handlebar.
Figure 2A:
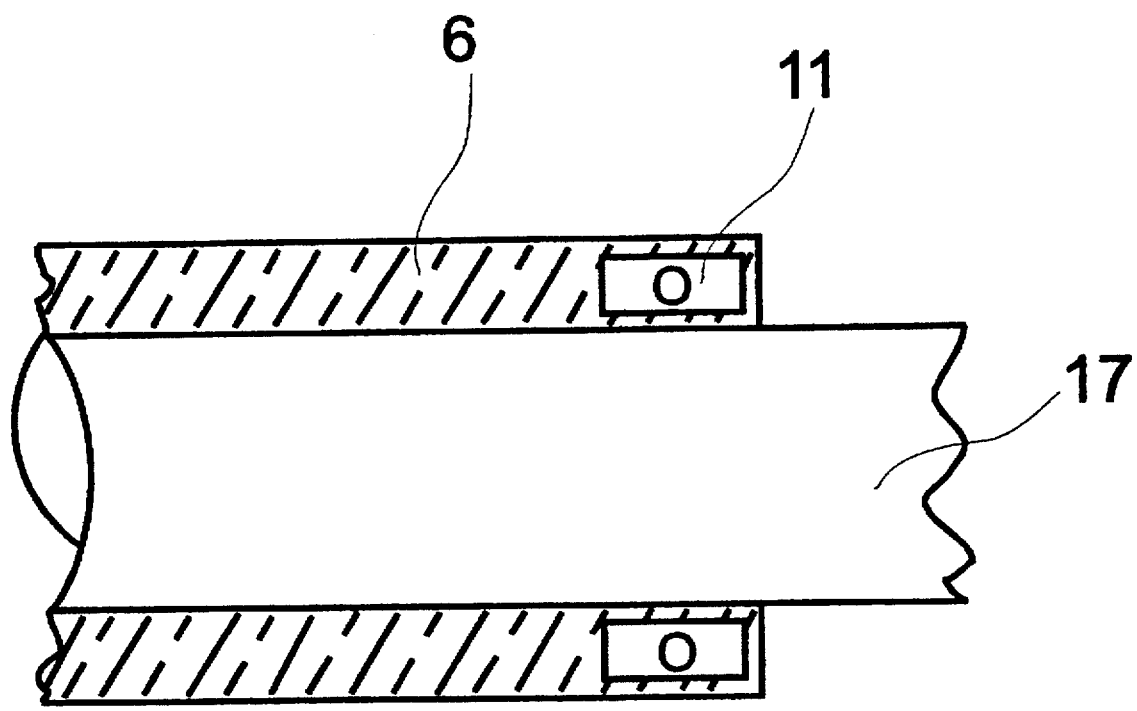
FIG. 2A is a longitudinal section of FIG. 2 showing the ribbon switch.
Figure 3:
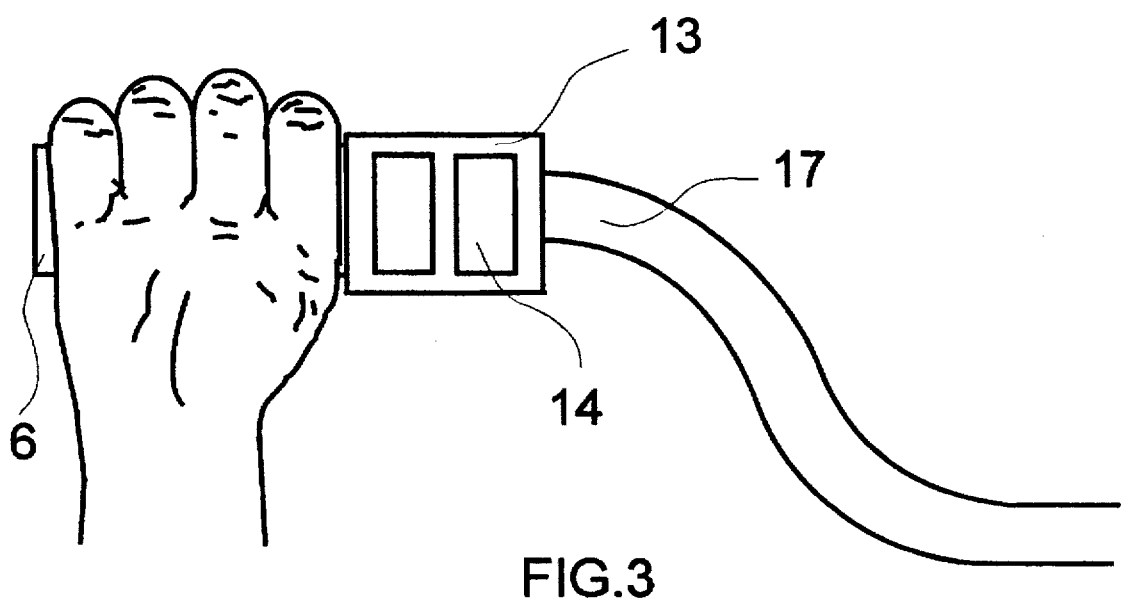
FIG. 3 is an elevational view illustrating a firm grip.

With reference to the drawings a rubber hand grip 6 has a circumferential recess 8 around the hollow interior 7 adjacent end 10. A ribbon switch 11 is placed in said recess 8 so as to encompasses a 360 degree arc. The recess 8 dimensions are determined by the particular ribbon switch 11 used. In a preferred embodiment the ribbon switch 11 is a momentarily on actuation switch, whose dimensions are: 1.43 cm (9/16") wide by 0.40 cm (5/32") thick and whose length is determined by the circumference of the handlebar 17 and particularly the recess in hand grip 6. As diagrammed in. FIG. 2, when the hand grip 6 is placed on the handlebar 17 with the ribbon switch 11 inserted in its recess 8, there will be two leads 15 and 16 that will be connected to the warning device and the battery in a manner known to those skilled in the art.

Figure 4:
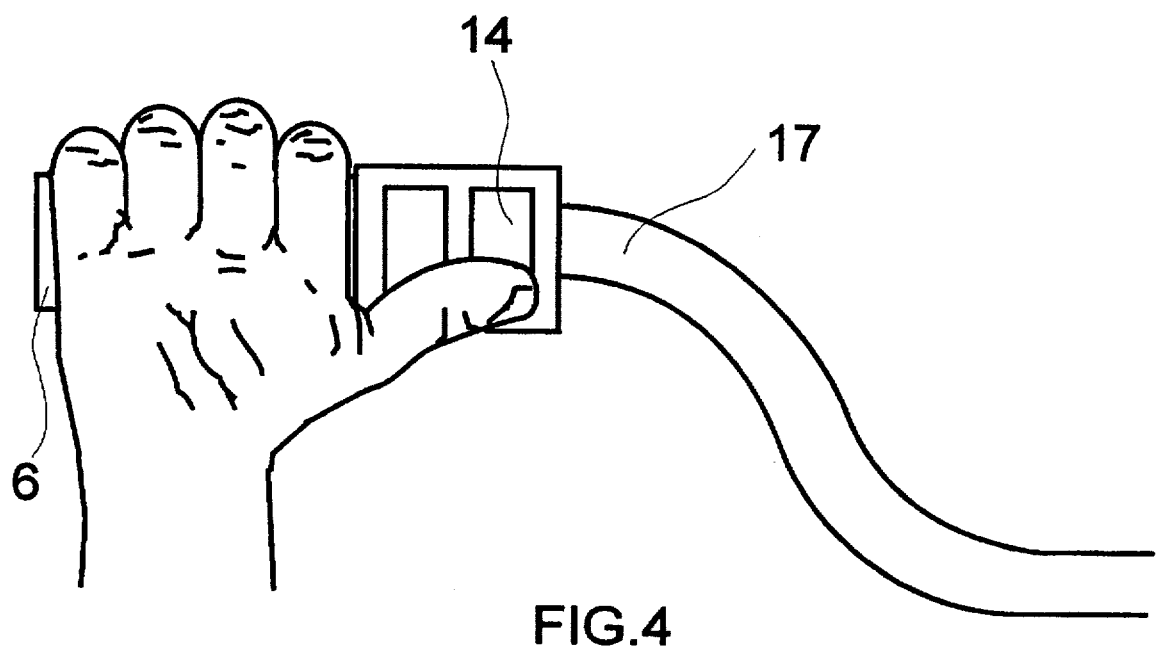
FIG. 4 is an elevational view illustrating the prior art method of actuating a warning device.

With reference to FIG. 4, there is illustrated an example of the cyclists' normal hand placement on the hand grip 6. When the warning device is called for, the cyclist need only squeeze the hand grip with thumb, and or index finger, thereby retaining a firm complete grip. No longer is there a need to remove the thumb from the hand grip to actuate said warning device. As pictured in FIG. 4, the prior art requires one to shift his grip and extend a thumb in order to actuate the warning devices switch 14.

Cyclist's use the handlebar 17 to control a cycle. A hand grip 6 is placed onto the handlebar 17 for griping stability and comfort. The ribbon switch 11 is located within the recess 8 at the inside end 10, the right end 10 of the left handlebar, whereby normal hand placement will not actuate the warning device unless deliberate. As said hand grip 6 is compressed at any point over the ribbon switch 11 360 degree area, the circuit is closed thereby actuating the warning device. When compression on the hand grip 6 is released, the ribbon switch 11 is returned to its open position, therefore inactivating said warning device. As can be readily appreciated, there are safety advantages of employing the hand grip switch on cycles. Retaining a firm complete grip, the warning device actuation procedure is no longer a hazard to the operator, therefore providing the cyclist with proper control and safety throughout its operation.

While my above description contains many specificities, these should not be construed as limitations on the scope of the invention, but rather as an exemplification of one preferred embodiment thereof. Many other variations are possible. For example the ribbon switch may be wrapped around the outside diameter of the hand grip or incorporated within the other end 9 of the hand grip.

Accordingly, the scope of the invention should be determined not by the embodiment illustrated, but by the appended claims and their legal equivalents.

I claim:

1. An actuation device for a motorcycle or the like having a substantially rigid handlebar comprising a hand grip fitted on the handlebar, said grip being tubular, an elongated momentary strip switch completely encircling the inner end of the hand grip substantially at a location where the thumb of an operator would normally rest whereby engagement of the switch by means of compression will result in actuation.

2. A switch device for a motorcycle or the like having a substantially rigid handlebar, a handle grip fitted on the handlebar, said grip comprising a tubular member having an internal recess at the inner end thereof, said grip being made of resilient material, an elongated switch of spaced strips mounted in and substantially filling said recess whereby engagement of the end of the grip will flex the grip and compress the switch to effect contact.

\* \* \* \* \*